United States Patent
Sie et al.

(10) Patent No.: US 7,464,392 B2
(45) Date of Patent: Dec. 9, 2008

(54) VIEWING LIMIT CONTROLS

(75) Inventors: John J. Sie, Englewood, CO (US); Gregory R. DePrez, Highlands Ranch, CO (US); John C. Beyler, Highlands Ranch, CO (US); Jean Paul Casaubon, Aurora, CO (US)

(73) Assignee: Starz Encore Group LLC, Englewood, CO (US)

( * ) Notice: Subject to any disclaimer, the term of this patent is extended or adjusted under 35 U.S.C. 154(b) by 854 days.

(21) Appl. No.: 10/300,723

(22) Filed: Nov. 19, 2002

(65) Prior Publication Data
US 2003/0124973 A1    Jul. 3, 2003

Related U.S. Application Data

(60) Provisional application No. 60/331,886, filed on Nov. 20, 2001.

(51) Int. Cl.
*H04N 7/16* (2006.01)
*H04N 7/173* (2006.01)

(52) U.S. Cl. .................................. 725/29; 725/87

(58) Field of Classification Search ............ 725/8, 725/5, 2, 25, 27, 28, 29, 87, 104, 6, 30, 46
See application file for complete search history.

(56) References Cited

U.S. PATENT DOCUMENTS

| | | | |
|---|---|---|---|
| 4,484,217 A * | 11/1984 | Block et al. ................... 725/1 |
| 4,706,121 A * | 11/1987 | Young ......................... 348/27 |
| 5,130,792 A | 7/1992 | Tindell et al. |
| 5,191,573 A | 3/1993 | Hair |
| 5,400,402 A * | 3/1995 | Garfinkle .................... 380/231 |
| 5,548,345 A * | 8/1996 | Brian et al. .................. 725/27 |
| 5,589,892 A | 12/1996 | Knee et al. |
| 5,610,653 A | 3/1997 | Abecassis |
| 5,619,249 A | 4/1997 | Billock et al. |
| 5,684,918 A | 11/1997 | Abecassis |
| 5,734,853 A | 3/1998 | Hendricks et al. |
| 5,798,785 A * | 8/1998 | Hendricks et al. ............. 725/46 |
| 5,805,154 A | 9/1998 | Brown |

(Continued)

FOREIGN PATENT DOCUMENTS

JP    2002281472 A  *  9/2002

(Continued)

OTHER PUBLICATIONS

Ciciora, Walter; James Farmer; David Large; *Modern Cable Television Technology: Video, Voice, and Data Communications*; Morgan Kaufmann Publishers, Inc.; 1999; Chapter 16; pp. 659-688.

*Primary Examiner*—John W. Miller
*Assistant Examiner*—Dominic Saltarelli
(74) *Attorney, Agent, or Firm*—Townsend and Townsend and Crew LLP

(57) ABSTRACT

A system for controlling the viewing of programs at a user location having one or more viewing devices. The system comprises a viewing control system, which is adapted to count a number of viewings of a program during a time period, determine whether the number of viewings exceeds a viewing limit for the time period, and prevent further viewings of the program if the number of viewings exceeds the viewing limit for the time period.

36 Claims, 9 Drawing Sheets

U.S. PATENT DOCUMENTS

| | | | |
|---|---|---|---|
| 5,861,906 A * | 1/1999 | Dunn et al. | 725/87 |
| 5,973,683 A * | 10/1999 | Cragun et al. | 345/719 |
| 5,995,134 A | 11/1999 | Hayashi | |
| 6,025,868 A * | 2/2000 | Russo | 725/104 |
| 6,046,760 A * | 4/2000 | Jun | 725/100 |
| 6,049,333 A | 4/2000 | LaJoie et al. | |
| 6,057,872 A * | 5/2000 | Candelore | 725/23 |
| RE36,801 E | 8/2000 | Logan et al. | |
| 6,163,272 A | 12/2000 | Goode et al. | |
| 6,166,730 A * | 12/2000 | Goode et al. | 345/716 |
| 6,209,024 B1 | 3/2001 | Armstrong et al. | |
| 6,229,895 B1 | 5/2001 | Son et al. | |
| 6,233,389 B1 | 5/2001 | Barton et al. | |
| 6,233,607 B1 | 5/2001 | Taylor et al. | |
| 6,240,553 B1 | 5/2001 | Son et al. | |
| 6,253,375 B1 | 6/2001 | Gordon et al. | |
| 6,282,207 B1 | 8/2001 | Lerman et al. | |
| 6,314,572 B1 | 11/2001 | LaRocca et al. | |
| 6,314,573 B1 | 11/2001 | Gordon et al. | |
| 6,314,575 B1 | 11/2001 | Billock et al. | |
| 6,324,338 B1 | 11/2001 | Wood et al. | |
| 6,445,398 B1 | 9/2002 | Gerba et al. | |
| 6,463,585 B1 | 10/2002 | Hendricks et al. | |
| 6,636,607 B1 * | 10/2003 | Yang et al. | 381/2 |
| 2001/0003846 A1 | 6/2001 | Rowe et al. | |
| 2002/0032905 A1 * | 3/2002 | Sherr et al. | 725/38 |
| 2002/0077880 A1 | 6/2002 | Gordon et al. | |
| 2002/0120498 A1 | 8/2002 | Gordon et al. | |
| 2003/0040962 A1 | 2/2003 | Lewis | |
| 2003/0126595 A1 | 7/2003 | Sie et al. | |

FOREIGN PATENT DOCUMENTS

| | | |
|---|---|---|
| WO | WO 00/59220 A1 | 10/2000 |
| WO | WO 01/52543 A1 | 7/2001 |
| WO | WO 03/044835 A3 | 5/2003 |

\* cited by examiner

VIEWING LIMIT CONTROLS

CROSS-REFERENCES TO RELATED APPLICATIONS

This patent application claims the benefit of U.S. Provisional Patent Application Ser. No. 60/331,886, filed on Nov. 20, 2001, and entitled "Video On Demand Controls," the entirety of which is incorporated by reference herein for all purposes.

In addition, this application is being filed contemporaneously with related U.S. patent application Ser. No. 10/300,682, entitled "Systems And Methods For Providing Marketing Messages And Incentives Based On Viewing Limits And Viewing Limit Levels", the entirety of which is incorporated by reference herein for all purposes.

BACKGROUND OF THE INVENTION

This invention relates in general to content delivery, and more specifically, to delivering a predetermined number of viewings of program content to users.

Presently, the traditionally separate telecommunication services, such as phone service, cable service, and data service, are merging together, so that service providers can provide all different types of content through a single medium. For example, service providers are competing to provide end users with content, such as telephone service, video programs, sound recordings, still photographs or pictures, data, etc., through a number of different communication means, such as cable television systems, satellite systems, cellular systems, or Internet connections, which can include the previous listed communication connections, as well as POTS, xDSL, microwave, and any other suitable telecommunication interfaces. Regardless of how the content is delivered to the end user, however, for various different business and sociological reasons, the content provider may want to control access to some of the content, for example, by controlling the number of viewings, downloads or connections to the content.

One area in which controlling access to content is becoming increasingly important is the video programming area. As one skilled in the art will appreciate, the number of times a movie is allowed to be watched in a given time period is controlled by a number of factors, such as studio agreements, royalty rates, and perhaps a subscription level of the user. Thus, it may be desirable to control the number of viewings a user may have to video or movie program content provided through vehicles such as pay per view (PPV), video on demand (VOD), near video on demand (NVOD) and subscription video on demand (SVOD) services.

Similarly, it may be desirable to control the access to online or Internet content, such as music, interactive games, computer programs, etc. Thus, what is needed are systems and methods for controlling access to content regardless of the means or systems used to deliver the content.

BRIEF SUMMARY OF THE INVENTION

One embodiment of the invention comprises a system for controlling viewing of video programs at a user location having one or more viewing devices. The system comprises a video distribution system adapted to provide video programs to one or more viewing devices at a user location. The system further comprises a viewing control system, which is adapted to count a number of viewings of a program during a time period, determine whether the number of viewings exceeds a viewing limit for the time period, and prevent further viewings of the program if the number of viewings exceeds the viewing limit for the time period.

In one embodiment, the video distribution system comprises a cable programming distribution network. In another embodiment, the video distribution system comprises a satellite programming distribution network. In yet another embodiment, the video distribution system comprises a video server connected to the Internet.

In one embodiment, the viewing control system comprises a server located at a program service provider. In another embodiment, the viewing control system is configured with the video distribution system. In yet another embodiment, the viewing control system comprises a computing device at the user location in communication with a server located at a program service provider. In accordance with this aspect of the present invention, the computing device at the user location may comprise, for example, a set-top box, a personal video recorder (PVR), a video server, a television having set-top box and/or PVR functionality built therein, and/or a personal computing device.

In some embodiments, the programs may comprise pay per view video on demand (VOD) programs, near VOD (NVOD) programs, subscription VOD (SVOD) programs, network programs, cable programs, premium channel programs, and pay-per view event programs. The time periods in which viewings may be limited may comprise, for example, years, months, weeks, days, portions of days, or hours. The portions of days may comprise, for example, morning, afternoon, evening, night, and prime time viewing period. In some embodiments, the viewing limit can be different for different types of programs or content.

In accordance with other embodiments of the present invention, the viewing control system can be adapted to count a viewing after a predetermined amount of time of the program is viewed. For example, the predetermined amount of time of the program may be a preview or clip of the program. In accordance with yet other embodiments of the present invention, the one or more viewing devices may comprise a television set, a set-top box, a PVR, a computer, a PDA, a cellular phone, or any combination of these devices.

In accordance with still other embodiments of the present invention, the viewing control system may be adapted to provide a user interface that shows the number of viewings available to the user for one or more time periods. For example, the user interface may comprise a message on a programming menu stating the number of viewings available to the user for the one or more time periods, or the user interface may comprise an icon on a programming menu indicating the number of viewings available to the user for the one or more time periods.

In accordance with yet other embodiments of the present invention, the viewing control system may be adapted to count a number of viewings viewed using all of the one or more viewing devices associated with a user account, and prevent further viewings for all of the one or more viewing devices if the number of viewings exceeds the viewing limit for the user account for the time period. Similarly, the viewing control system may be adapted to count a number of viewings viewed by each of the one or more viewing devices separately, and prevent further viewings for each of the one or more viewing devices separately if the number of viewings for the one or more viewing devices exceeds the viewing limit for the time period.

In accordance with still another embodiment of the present invention, a method for monitoring the viewing of video programs at a user location having one or more viewing devices, in which the method comprises counting a number of viewings of a video program during a time period, and invoking a business rule based on the number of viewings counted. In accordance with one aspect of this embodiment, the business rule comprises determining whether the number of viewings exceeds a viewing limit for the time period, and preventing further viewings of the program if the number of viewings exceeds the viewing limit for the time period.

A more complete understanding of the present invention may be derived by referring to the detailed description of preferred embodiments and claims when considered in connection with the figures.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION OF THE INVENTION

Viewing Limit Controls

Figure 1A:
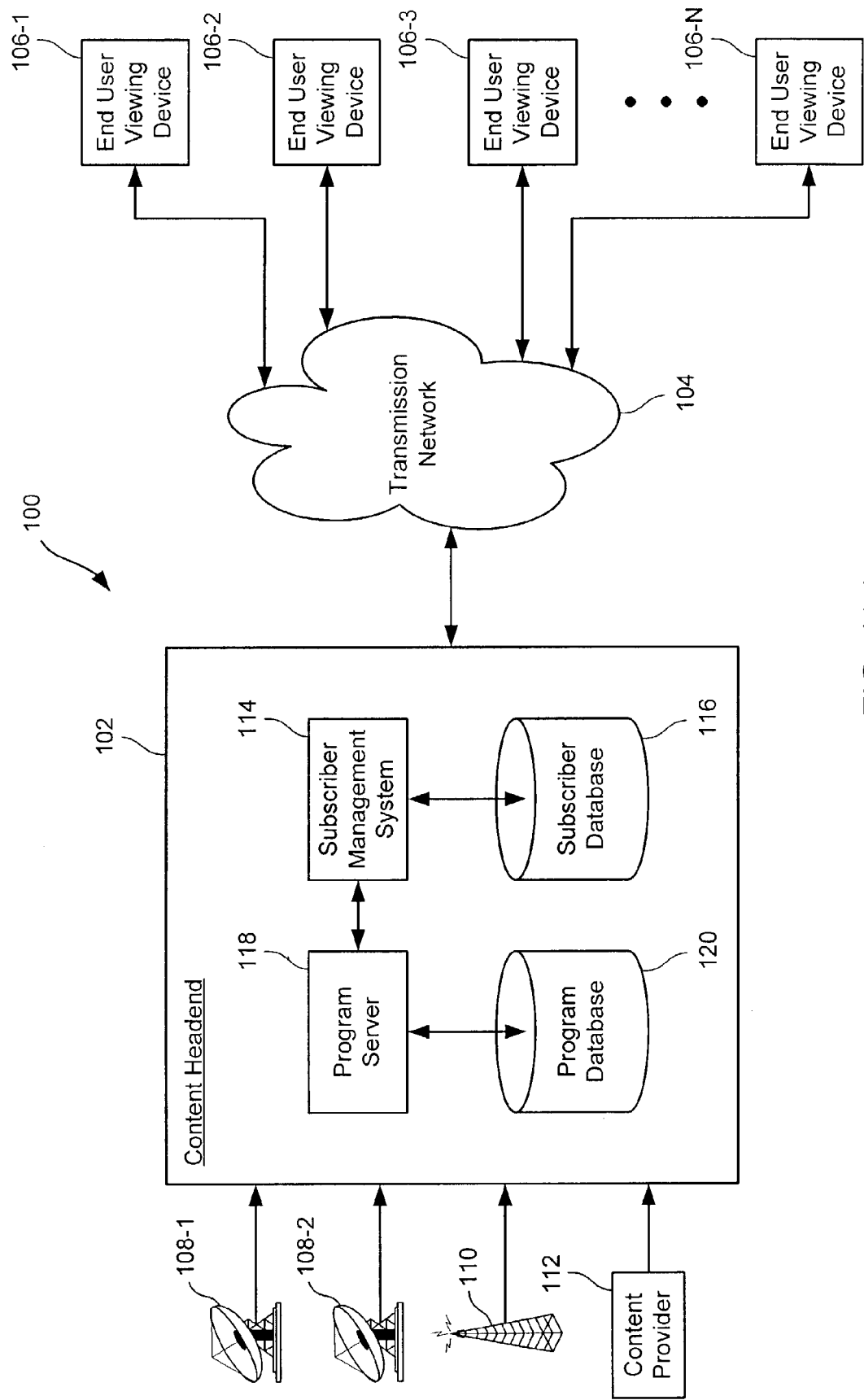
FIG. 1(a) is a block diagram a system in accordance with one embodiment the present invention.

The present invention provides systems and methods for controlling the viewing of and/or access to program content. More particularly, the present invention provides viewing limit control systems and methods for limiting the number of viewings of programs or program content that a user may have.

As used herein, the terms programs and program content refer to any content that can be provided to end users via telecommunication networks and connections, and for which it is desirable to limit end user viewings or access of such content. For example, programs can be video programs and/or music programs. Further, the programs can be delivered to end users using any number of different business and delivery models such as, for example, pay per view video programming or subscription programming delivered via satellite or on demand using any suitable communication network.

Regardless of the types of programs being provided or the business model being implemented, the present invention can be configured to limit the number of programs and/or the number of viewings of each of the programs to which end users may have access for a given time period. As discussed above, the viewing limit controls of the present invention can be implemented for any suitable content and/or programs and with any suitable communication network configuration. For ease of description, however, this specification will use examples of video programming, such as pay per view VOD, near VOD (NVOD), and subscription VOD (SVOD) to illustrate exemplary embodiments of the present invention. One skilled in the art should recognize, however, that the present invention is not limited to video programming or the embodiments set forth in this specification.

Throughout the rest of this document, unless specified otherwise, the term VOD shall refer collectively to pay per view VOD, NVOD and SVOD. As one skilled in the art will appreciate, VOD is a service in which one or a number of video programs are made available to subscribers during a time period. For example, video programs may be provided to users on-demand on a pay per view basis, or each month a new lineup of a predetermined number of programs (e.g., 10) may be made available to subscribers who pay a monthly subscription fee (e.g., $5 per month). In accordance with some embodiments of the invention, viewing limits can be defined for the viewing of those programs. For example, a predetermined viewing limit can be defined for one or all of the programs during a specified time period.

In one embodiment of the present invention, the viewing limit may be a value between one and infinity for a particular time period. Other embodiments could limit the value between zero and ninety-nine. For example, a first program may have a limit of five, a second program has a limit of one, and a third program has no limit.

In accordance with other embodiments of the invention, the viewing limit may be different for different time periods. For example, a given program may have a first viewing limit for a first time period that is different from a second viewing limit for a second time period. In some embodiments, those time periods could be back-to-back. For example a first time period has a view limit of ten and the next time period has a limit of twenty.

The time period could be different in various embodiments. In some embodiments, the time period could be years, portions of years (e.g., half-years or quarter), months, weeks or days. In other embodiments, the time period is tied to portions of the day, such as morning, afternoon, evening, late evening, night, prime time viewing, etc. In other embodiments, the time period could be combinations of the above. For example, the viewing limit for a particular program might be one viewing of the program during the prime time period in a month, and the viewing limit for the same program might be five viewings of the program during non-prime time periods in a month.

As one skilled in the art will appreciate, the viewing limit can be any number of viewings in any particular time period or combination of time periods. In addition, the viewing limits may be different for different types of programs. For example, newer or more popular movies may have lower viewing limits than older or less popular ones. In other embodiments, the viewing limits can be set for a single program or for groups of programs. For example, in a SVOD service, a user may have access to a number of different programs in a given time period (e.g., 20 programs). In one embodiment, viewing limits may be set for each program individually, or the service provider may apply a cumulative viewing limit to all the programs together as a whole. Thus, the programs in a group could be viewed a set number of times without regard to the program being played. For example, a cumulative viewing limit for a group of twenty programs could be defined as ten. In one time period, the first program could be viewed ten times and the others none. In another time period, the first and second programs could be viewed five times each to reach the cumulative viewing limit. Any combination of programs viewed in the group is possible so long as the cumulative viewing limit is not exceeded in the time period.

In some embodiments, the viewing limits can change when the program lineup changes, or the viewing limits can change when time periods change, such as, for example, monthly, weekly, daily or hourly, depending on what the time period is.

In accordance with one embodiment of the present invention, a viewing may be counted toward the viewing limit as soon as a user initiates a viewing of a program. In other embodiments, a viewing may not be counted until after a predetermined period of viewing time has elapsed or until a minimum portion of the program is viewed. For example, a service provider may allow a user to preview a program prior to counting an official viewing. The preview can be a clip of a program defined by the service provider, or the preview can be some other clip of a program, such as a predetermined length of the program at some point in the program, for example. In another embodiment, a free viewing period may be available. During that period, programs can be viewed any number of times. The free viewing period may or may not be limited to subscribers of the service that include the programs.

When a viewing limit is reached, any one or more of a number of business functions may occur. For example, in one embodiment, when a user reaches the viewing limit, a service provider could charge an additional per use fee for viewing past the viewing limit in a given time period. In some embodiments, the viewing limit can be reset if the program is available again in the next defined time period.

In other embodiments of the present invention, messages may be presented to the user stating that a viewing limit has been reached, or a programming guide may be changed to reflect the viewing limit. For example, when a view limit is reached, the program may be explicitly removed from the lineup displayed in a menu or electronic program guide (EPG). The menu or EPG shows the programs available for viewing in the VOD modes. Once a program has reached its viewing limit for the time period, the menu or EPG can reflect that it is unavailable or can remove it from being displayed as an option to the user altogether.

In accordance with other embodiments, icons can be present on the viewing screen showing the number of viewings available to the user, or icons can be displayed on the menu or EPG. For example, icons could be shown in a channel versus time programming grid type EPG. These icons could disappear when the viewing limit is reached. Where the user is given no indication that a program is unavailable, but that user has reached the viewing limit, and the user attempts to select the program, a message may be displayed informing the user of the status or asking for authorization to further charge the user for extending the viewing limit. For a more detailed discussion of customization of electronic programming guides, see U.S. patent application Ser. No. 10/128,653 filed on Apr. 22, 2002, and entitled "Program Guide Environment," the entirety of which is incorporated by reference herein for all purposes.

As one skilled in the art will appreciate, any suitable messaging or notification system could be used to notify the user of the number of viewings left, or that the viewing limit has been reached. For example, instead of using messages or icons, different colors or shading could be used to show that a viewing limit has been reached. Thus, the present invention should not be limited to the embodiments disclosed herein.

System Configurations

In some embodiments of the present invention, a subscriber management system and/or viewing limit control system may be configured to provide the viewing limited programs, as defined above, to end users through a suitable communication network or connection. In some embodiments, the subscriber management system and the viewing limit control system may be separate systems. In other embodiments, the subscriber management system is configured to operate as the viewing limit control system. As one skilled in the art will appreciate, management control systems easily can be configured as a single system or multi separate systems. Thus, in this specification, the terms subscriber management system and viewing limit control system may be used interchangeably to refer to systems for implementing the viewing limit control functions and methods set forth herein.

The communication network or connection may comprise any communication network or connection currently known in the art or hereinafter developed. Examples of currently known communication networks include cable television networks, satellite television networks, vDSL networks, cellular networks, and Internet connections, such as dial-up POTS Internet connections, xDSL Internet connections, microwave Internet connections, cellular Internet connections, satellite Internet connections, and the like.

Figure 1B:
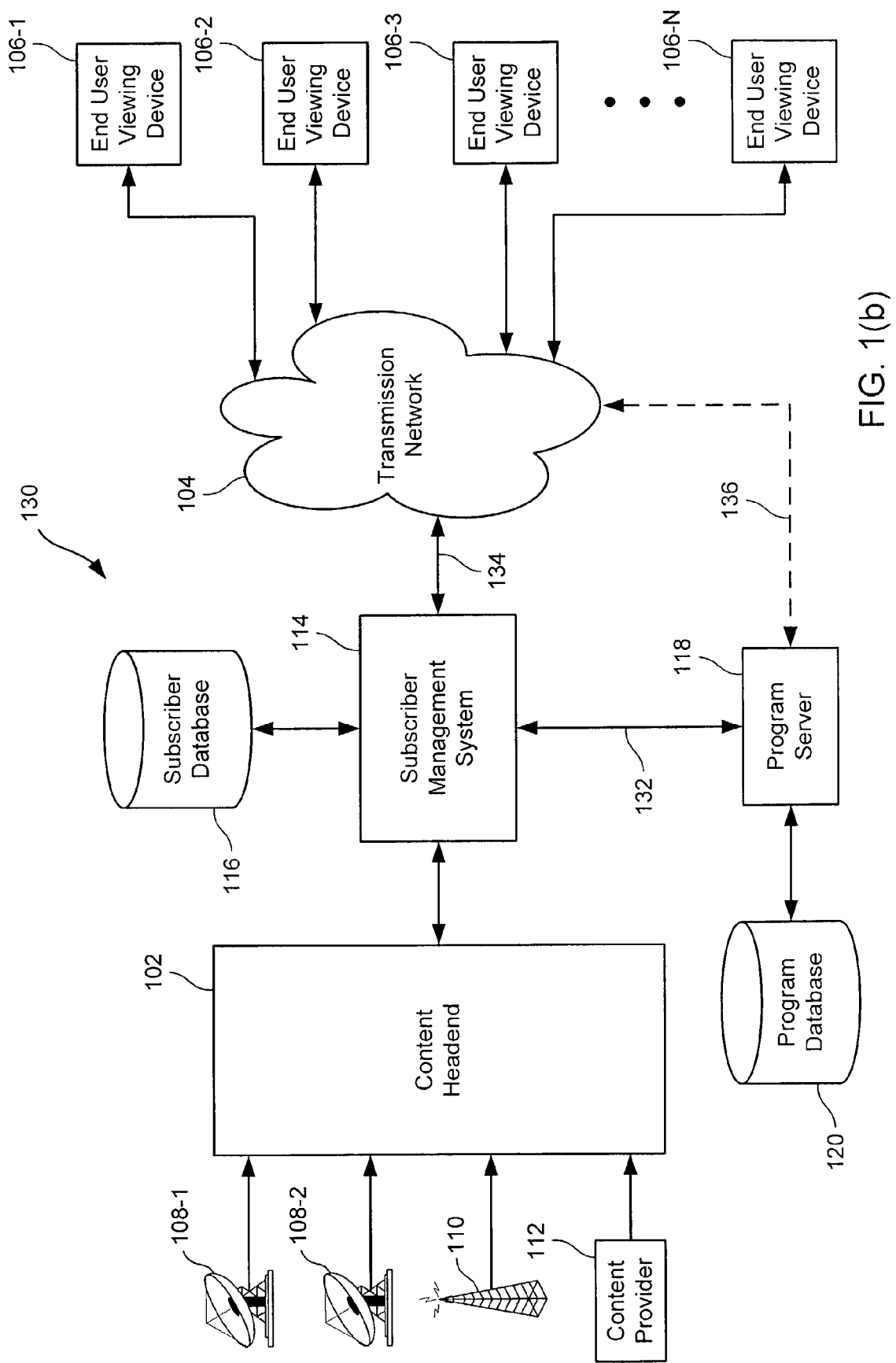
FIG. 1(b) is a block diagram showing a system in accordance with another embodiment of the present invention.
Figure 1C:
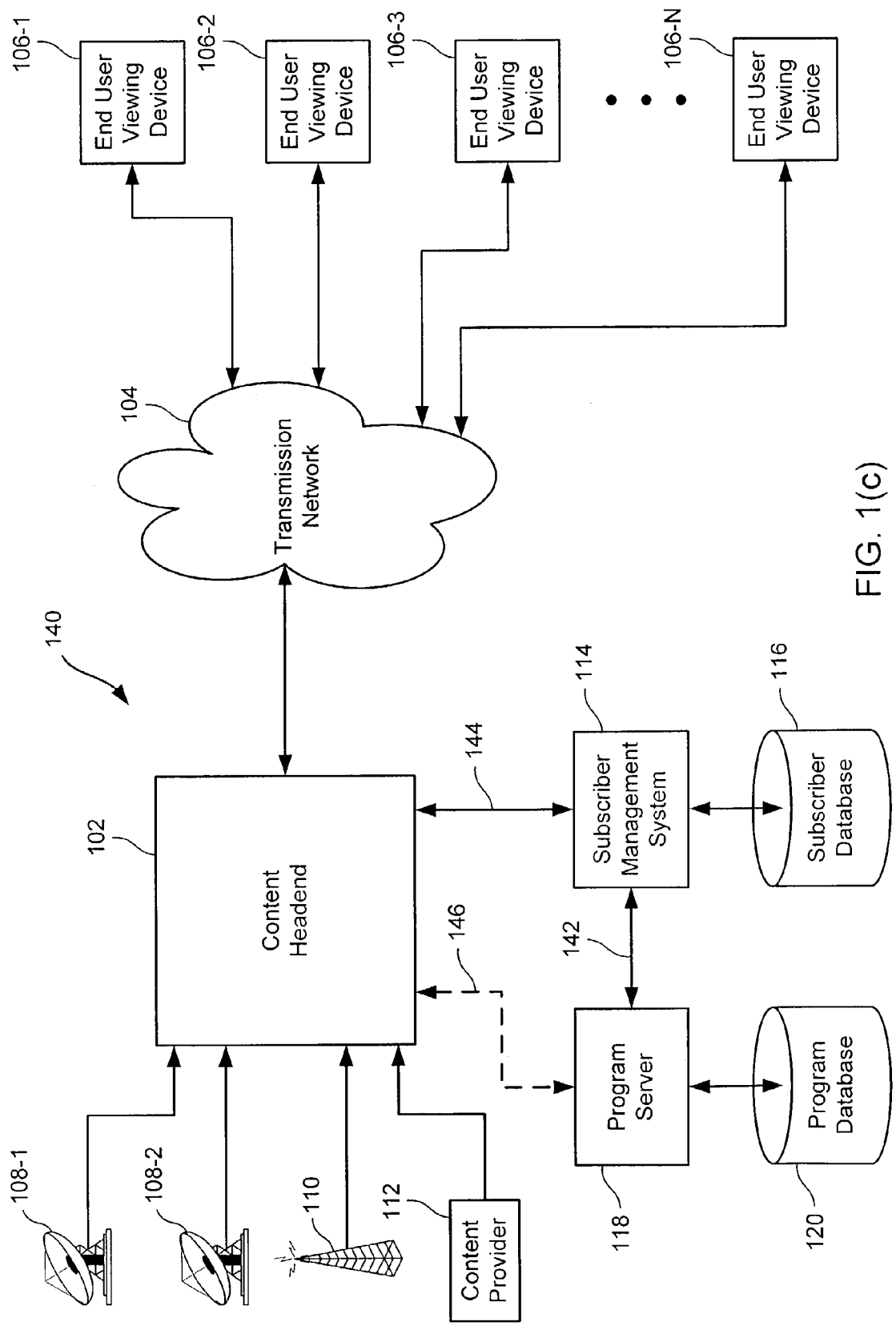
FIG. 1(c) is a block diagram of a system in accordance with yet another embodiment of the present invention.

FIGS. 1(a)-1(d) illustrate various different ways of configuring communication networks and subscriber management systems to implement the present invention. One skilled in the art will appreciate, however, that the embodiments illustrated in FIGS. 1(a)-1(c) are merely exemplary embodiments, and that other networks and system configuration may be used without departing from the spirit of the present invention. Thus, the present invention should not be limited to the illustrated embodiments.

Referring now to FIG. 1(a), one embodiment of a system 100 for implementing viewing limit controls in accordance with the present invention is shown. In the illustrated embodiment, system 100 comprises a content or program headend 102, a transmission network 104, and end user viewing devices 106. In one embodiment, headend 102 may be, for example, a cable or satellite headend for providing video, music and Internet/data content to end users.

As one skilled in the art will appreciate, a cable or satellite headend generally receives video and music programming from third-party sources, formats the programming, modulates the programming onto different channels, and delivers the programming to the end users through its associated transmission systems, such as cable, satellite, vDSL, or the like. In accordance with this aspect of the present invention, headend 102 may receive programming information from various third-parties, for example, via satellite receivers 108, broadcast antenna 110, or via a direct connection from a third party 112.

Transmission network 104 may comprise any suitable communication network currently known or hereinafter developed. In one embodiment, the transmission network is a cable distribution network currently known in the art. Other embodiments may include xDSL networks, satellite distribution networks, IP protocol networks, such as the Internet, a microwave or wireless communication network, or the like.

End user viewing devices 106 may comprise any suitable device for receiving and viewing content. For example, end user devices 106 may comprise a television set, a set-top box, a personal video recorder (PVR), a television set having set-top box and/or PVR functionality built in, any type of computing device such as a PC or a personal digital assistant (PDA), a cellular telephone, an IP telephone, or the like.

In accordance with one embodiment of the present invention, headend 102 further includes a subscriber management system 114 for managing subscribers of the services provided by the headend system. For example, subscriber management system 114 determines to which programs and services a subscriber or user has access, such as local channel access or premium channel access. In addition, subscriber management system 114 can be configured to manage the provisioning of pay services, such as pay-per-view programming, VOD programming, and the like. In the illustrated embodiment, subscriber management system 114 comprises or is connected to a subscriber database 116, which stores subscriber specific data, such as subscriber name, address, billing information, etc. Subscriber database 116 also may store the types of services the subscriber or user has access to, such as pay channels or the like.

In one embodiment, the subscriber management system also may be used to provision the VOD services. In accordance with this aspect of the invention, subscriber management system 114 is in communication with a program server 118, which comprises a program database 120. When a subscriber or user orders VOD services, subscriber management system 114 validates the order and handles the billing procedures for the provisioned service. If the user is valid and meets the conditions for receiving the service, subscriber management system 114 in conjunction with program server 118 will provide the service or program to the user.

In one embodiment, program server 118 and program database 120 are configured to provide the VOD services to the end user viewing device 106 via transmission network 104. A more detailed discussion on how VOD services may be provisioned is set forth in U.S. patent application Ser. No. 09/687,149 filed on Oct. 12, 2000 and entitled "Programming Distribution System," the entirety of which is incorporated by reference herein for all purposes.

In the illustrated embodiment subscriber management system 114 and program server 118 are configured as part of headend 104. In this embodiment, the VOD programs can be modulated onto a particular channel at the headend and delivered to the end user devices via the network.

In accordance with one embodiment of the present invention, subscriber management system 114 may be configured to implement the viewing limit controls set forth herein. For example, subscriber database 116 can store the viewing limit and the current number of viewings for each user for each time period. When a use views a program during a time period, the subscriber management system will increment the current number of viewings by one or some other appropriate interval for the user. When the user's current number of viewings reaches the viewing limit, subscriber management system 114 can be configured to send a message to the user as discussed above. Also, if the system is configured to add or remove an icon or counter on a program menu, or change the color or shading of the menu when the viewing limit is reached, subscriber management system 114 can be configured to perform these functions. Alternatively, subscriber management system 114 can communicate with headend 102 or some other system which creates and modifies the user interface menu, and then the headend or other system would be responsible for changing the presentation of the menu when a viewing limit is reached.

While one embodiment of the present invention is disclosed herein as having viewing limit controls function performed by or a part of subscriber management system 114, other embodiments of the invention could have a viewing limit control systems separate from subscriber management system 114. Thus, the present invention is not limited to the illustrated embodiments.

In the embodiment illustrated in FIG. 1(a), subscriber management system 114 and program server 118 are configured as part of headend 104. In an alternative embodiment, subscriber management system 114 and program server 118 can be separate from headend 104, for example as illustrated in FIGS. 1(b) and 1(c). FIG. 1(b) illustrates a system 130 in which subscriber management system 114 is positioned between headend 102 and transmission network 104. In this particular embodiment, content passes from headend 102 to subscriber management system 114. Subscriber management system 114 determines which content a user has authorization to access, and then passes that content on to end user devices 106 via transmission network 104.

As discussed above, subscriber management system 114 can be configured in communication with program server 118 and program database 120, and together can provide VOD and other qualified access services to the end users. In the illustrated embodiment shown in FIG. 1(b), the programs from program server 118 can be distributed to transmission network 104 through subscriber management system 114, for example, via communication connections 132 and 134, or the programs can be sent directly from programmer server 118 to transmission network 104, for example via communication connection 136. Regardless of how programs are distributed to the end users, subscriber management system 114 can be configured to implement the viewing limit control functionality as discusses above.

As illustrated in FIG. 1(c), in an alternative embodiment, subscriber management system 114 may be outside of headend 102, for example, if a separate service provider provides the VOD services to end users through the headend system. In this embodiment, the program services are provided by subscriber management system 114 and program server 118 to headend 102. Headend 102 receives the program content, modulates it onto a particular channel and delivers it to end user devices 106 via transmission network 104. As discussed above, subscriber management system 114 (or other suitable viewing limit control system) is configured to process the viewing limit functionality. As shown in FIG. 1(c), program server 118 can transmit the program content to headend 102 through subscriber management system 114, for example, via connections 142 and 144, or program server 118 can transmit the program content to headend 102 directly, for example via connection 146.

Figure 1D:
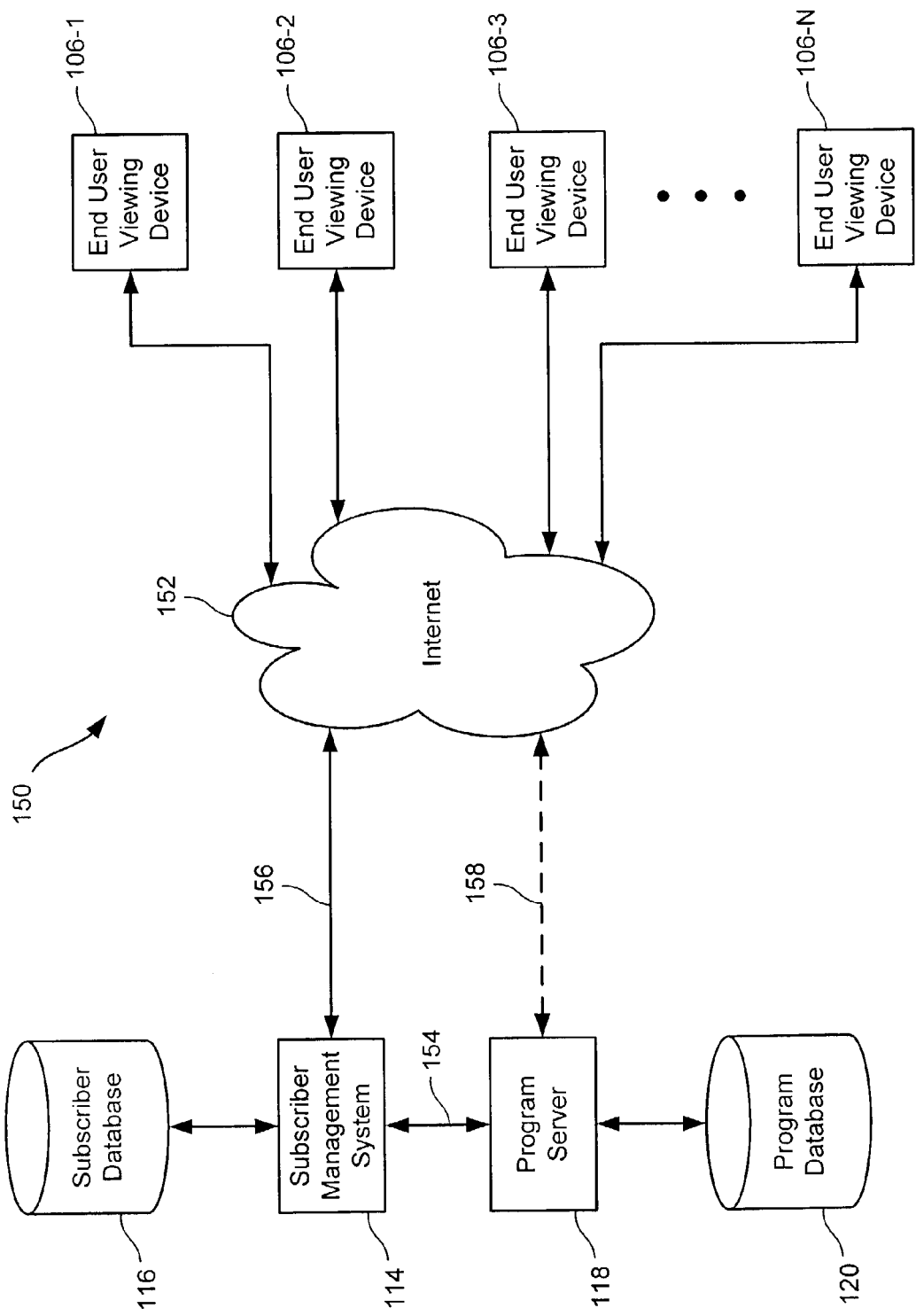
FIG. 1(d) is a block diagram of a system in accordance with yet another embodiment of the present invention.

Referring now to FIG. 1(d), another exemplary embodiment of the present invention is shown. This particular embodiment comprises a system 150, in which a subscriber management system 114 (or other suitable content delivery system) transmits program content directly to end user devices 106 via a communication network, such as the Internet 152. As discussed above, the program content can be any content delivered via the Internet (e.g., video programs, music programs, etc.), and end user devices 106 can be any viewing, listening or computing device which can receive and play the programs. As illustrated in FIG. 1(d), the programming content can be transmitted to Internet 152 from subscriber management system 114, for example, via connection 156, or the content can be transmitted to Internet 152 from some other content or program server 118, for example, via communication connection 158. In either case, subscriber management system 114 is configured to process the viewing limit control functionality.

In other embodiments of the invention, instead of the subscriber management system or viewing limit control system performing all the viewing limit control functionality, additional devices, such as devices 106, at the user location also can be used to implement some or all of the functionality. For example, a set-top box or PVR, or other viewing device such as a PC, PDA, or the like could be configured to track the program viewings and implement the viewing limit control features. In some embodiments, the end user device could store the programs local to the user location and then track the viewings at the user location. In accordance with this embodiment, when a viewing limit is reached, the end user device could be configured to limit any further viewings or provide a message to the end user, as discussed above.

In some embodiments, each time a program is viewed, the end user device may record the particulars of that viewing. For example, a partial viewing may be noted as such so that the viewing limit is reduced by a fraction for the partial viewing. The usage information may be stored for a period of time, and then can be analyzed and reported out. This usage information may be available to the billing system or the subscriber management system to properly charge the user.

In other embodiments, a subscriber management system in conjunction with the end user device may implement the viewing limit control features. For example, the end user device may count the viewings of programs and then send the viewing details to the subscriber management system so the subscriber database can be updated. Also, the end user device may be configured to report to the subscriber management system when a viewing limit is reached, and the subscriber management system then may send a message to the end user or update the viewing menu, as discussed above. In any event, one skilled in the art should appreciate that the viewing limit controls of the present invention can be implemented in any number of different ways, and thus, is not limited to the embodiments disclosed herein.

Applications of Viewing Limit Controls

Viewing Limits Generally

Figure 2:
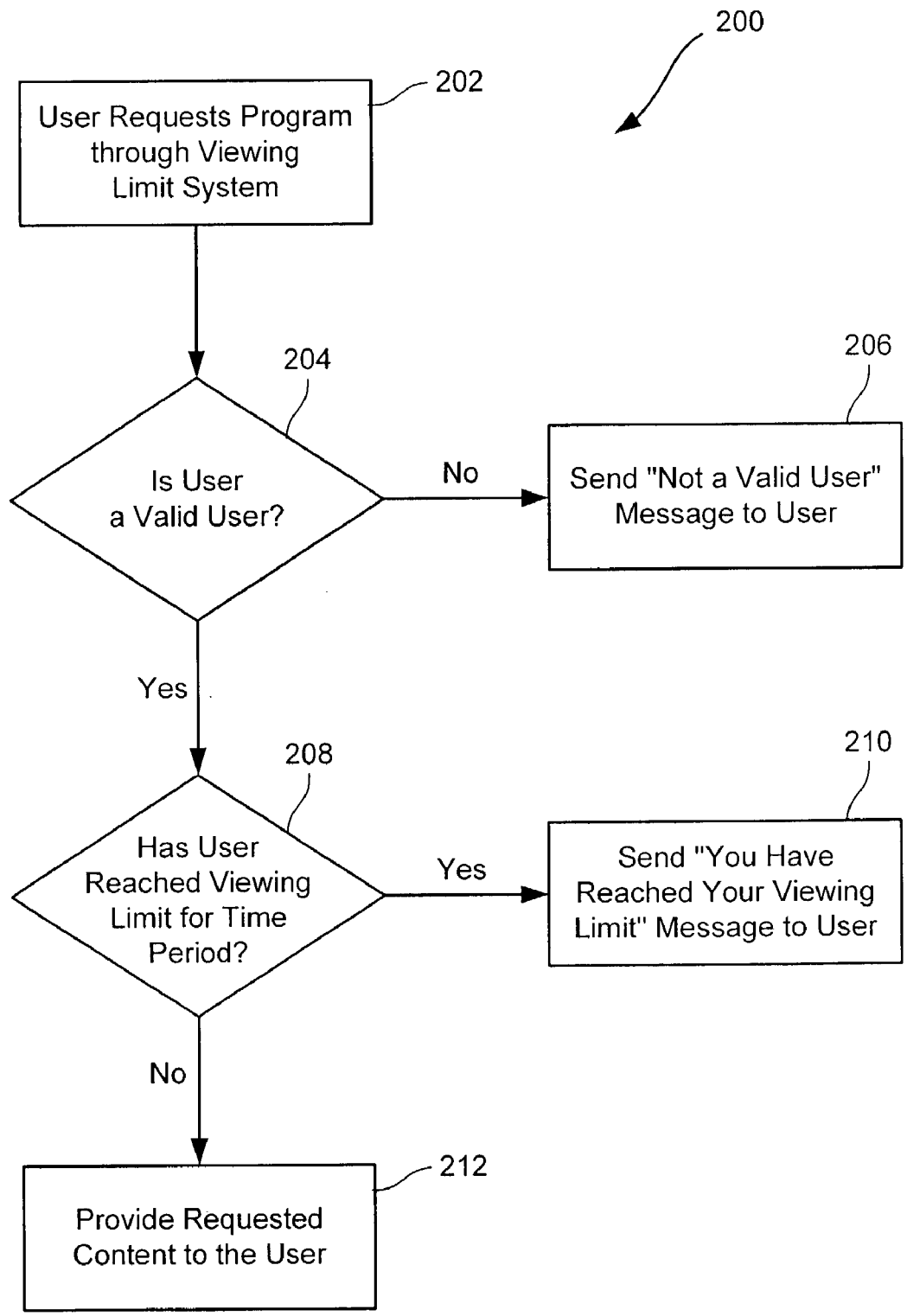
FIG. 2 is a flow chart showing a method for implementing viewing limit controls in accordance with one embodiment of the present invention.

Referring now to FIG. 2, a flow chart 200 illustrating a method for implementing viewing limit controls is shown. In accordance with the illustrated embodiment, a user requests to receive a program, for example, using an end user viewing device 106 as discussed above (block 202). In one embodiment, the request for content goes to a viewing subscriber management system 114 or other suitable viewing limit control system ("the System"), as discussed above (block 202). Upon receiving the program request, the System will check to determine is the user is a valid for the requested program (decision block 204). For example, in the VOD example, the System will determine if the user is a VOD subscriber. As one skilled in the art will appreciate, other user checks also may be implemented.

If the user is not a valid user, the System sends a message to that fact (block 206). If the user is a valid user, the System then determines if the viewing limit for the requested program for the time period has been reached (decision block 208). If the viewing limit has been reached for the time period, the System will send a message to the end user informing him that the view limit was reached (block 210). As discussed above, the system can use other indicators as well, such as altering the electronic programming guide or showing the viewing limit number on a screen.

If the viewing limit has not been reached for the requested program for the time period, the System will provide the end user with the program (block 212). In addition, the System will decrement the viewing limit number and can change the EPG or display to show the new viewing limit number.

Viewing Limit Portability

Viewing limits can be applied in different ways. In some embodiments, the viewing limit may apply to a particular end user device. In other embodiments, the viewing limit may apply to a number of end user devices associated with a user location. In still other embodiments, the viewing limit may be associated with a user such that it follows that user to any end user device in any location. For example, a user name and password entered into another's end user device, such as a set top box, could identify the user when visiting a friend. In some embodiments, the viewing limits could be tied to programming tiers, in which different programming tiers could be entitled to different viewing limits.

Figure 3A:
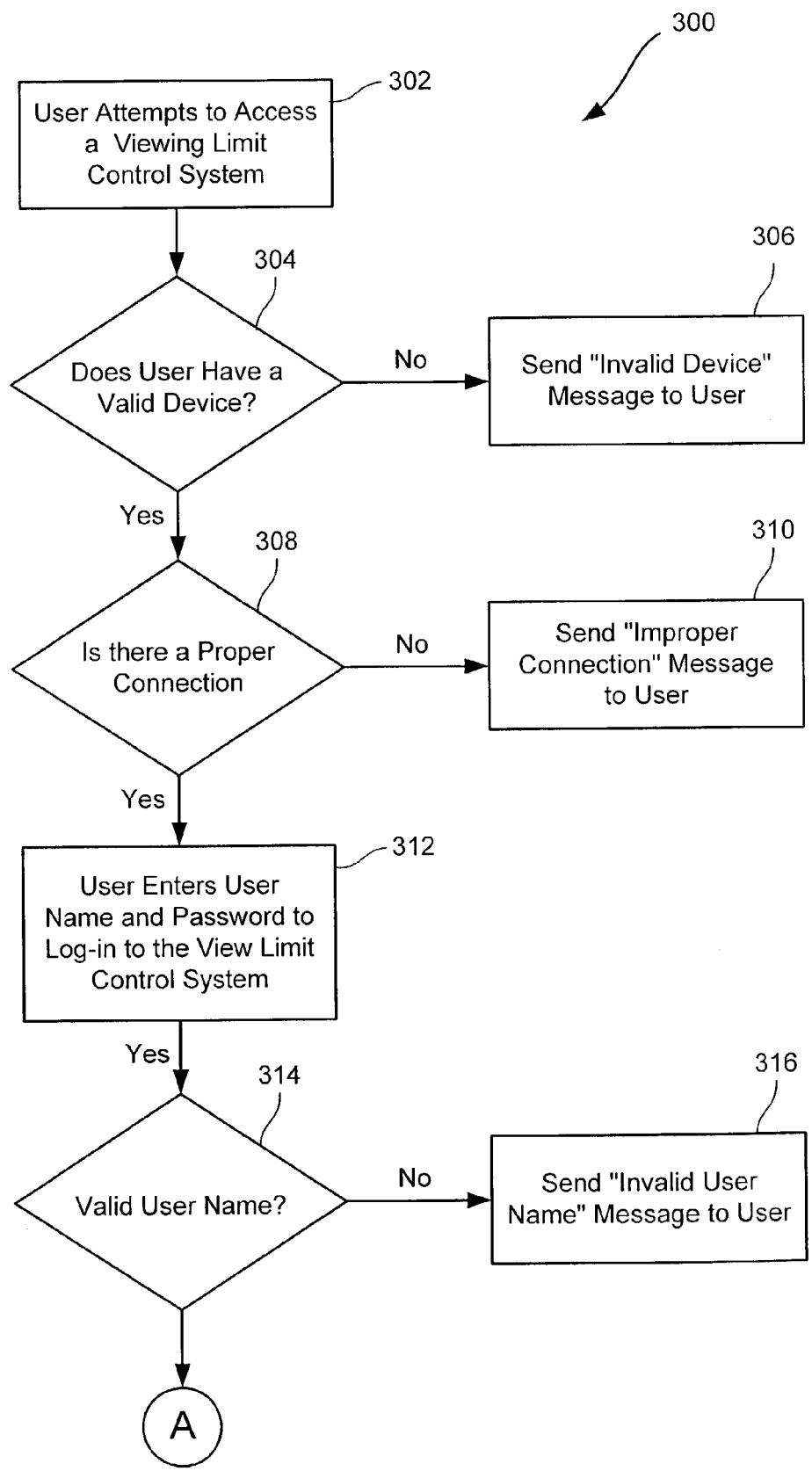
FIGS. 3(a) and 3(b) are flow charts showing a method for implementing the portability of viewing limit controls in accordance with one embodiment of the present invention.
Figure 3B:
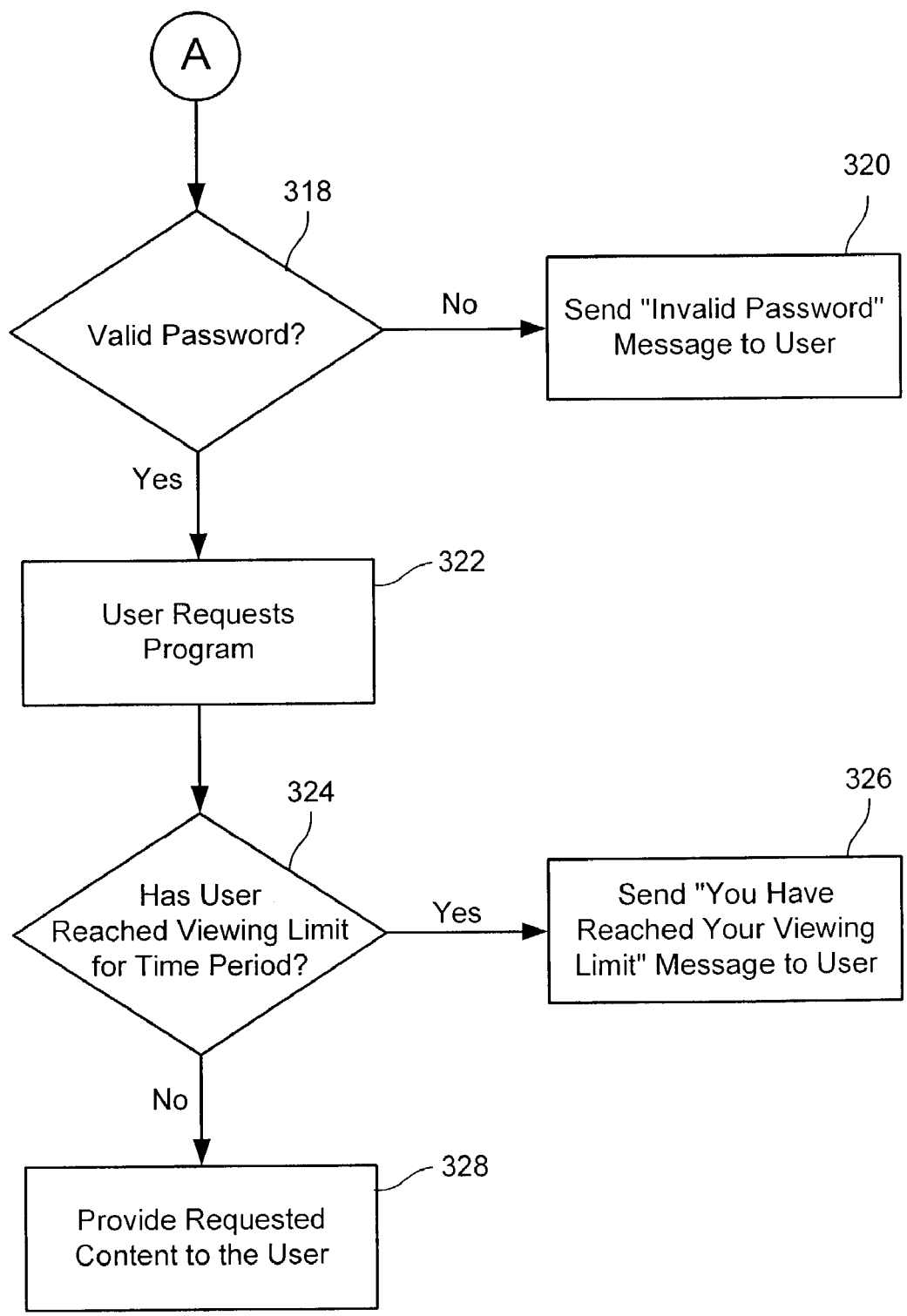

Referring now to flowchart 300 in FIGS. 3(*a*) and 3(*b*), a method for implementing the portability of viewing limit controls will be described. First, a user attempts to access a viewing limit control system at any location using any end user device (block 302). For example, a user may attempt to access the viewing limit control system via the internet using a computing device, such as a personal computer, a PDA, or the like. Alternatively, the user may attempt to access a video program, such as a VOD program, through a set top box or other video interface.

After the user attempts to access the viewing limit control system, the System checks to determine if the end user device is a valid device to access the program (decision block 304). For example, if the user is attempting to access a movie or other video program, the System will determine if the end user device is appropriate to view a movie. Similarly, the System may check the connection type to ensure that it has enough bandwidth to deliver the program efficiently (decision block 308). If the equipment and/or connection are not adequate for the requested program, the System will send a message to the user to that fact (blocks 306 and 310). Otherwise, the user will attempt to access the System by entering a user name and password or other login information (block 312). The System will authenticate the user by verifying the user name and password (decision blocks 314 and 318). If either the user name or password is invalid, the System will send a message to the end user stating such (blocks 316 and 320).

After the user successfully has logged-in to the System, the user will request the program that he wants (block 322). The system receives the request and checks to determine whether the user has reached the viewing limit for the requested program for the particular time period (decision block 324). If the viewing limit has been reached for the time period, the System will send a message to the end user informing him that the view limit was reached (block 326). As discussed above, the system can use other indicators as well, such as altering the electronic programming guide or showing the viewing limit number on a screen.

If the viewing limit has not been reached for the requested program for the time period, the System will provide the end user with the program (block 328). In addition, the System will decrement the viewing limit number and can change the EPG or display to show the new viewing limit number.

As one skilled in the art will appreciate, there are a number of different ways for the user to access the System and for the System to validate the user. For example, in some embodiments, it may be possible for the System to determine user information automatically, without the user having to enter in the information each time. For a more detailed discussion on different methods of implementing user access and authentication to such systems see U.S. patent application Ser. No.

10/128,654 entitled "Program Guide Enhancements" and U.S. patent application Ser. No. 10/131,507 entitled "Customization in a Content Distribution System," both of which were filed on Apr. 22, 2002, and both of which are incorporated by reference herein for all purposes.

Viewing Limit Parental Controls

In some embodiments, viewing limit controls in accordance with the present invention can be used to implement parental controls. As discussed above, viewing limits can be set for various different time periods and for different content. Thus, based on these parameters, parents can restrict access to different types of content during certain time periods using viewing limits. For example, if a parent wants to restrict access to adult content, the parent can set the viewing limit to zero. Similarly, the parent can set high viewing limits for educational or other acceptable content.

Also, the parent may want to limit access to programs during certain time periods. For example, a parent may want to set the viewing limit to zero for a time period immediately after school, essentially reserving that time for homework. Similarly, the parent may want to restrict access to late night programming by setting the viewing limit to zero for that time period. As one skilled in the art will appreciate, any combination of time period and content restrictions may be implemented using viewing limits.

Figure 4:
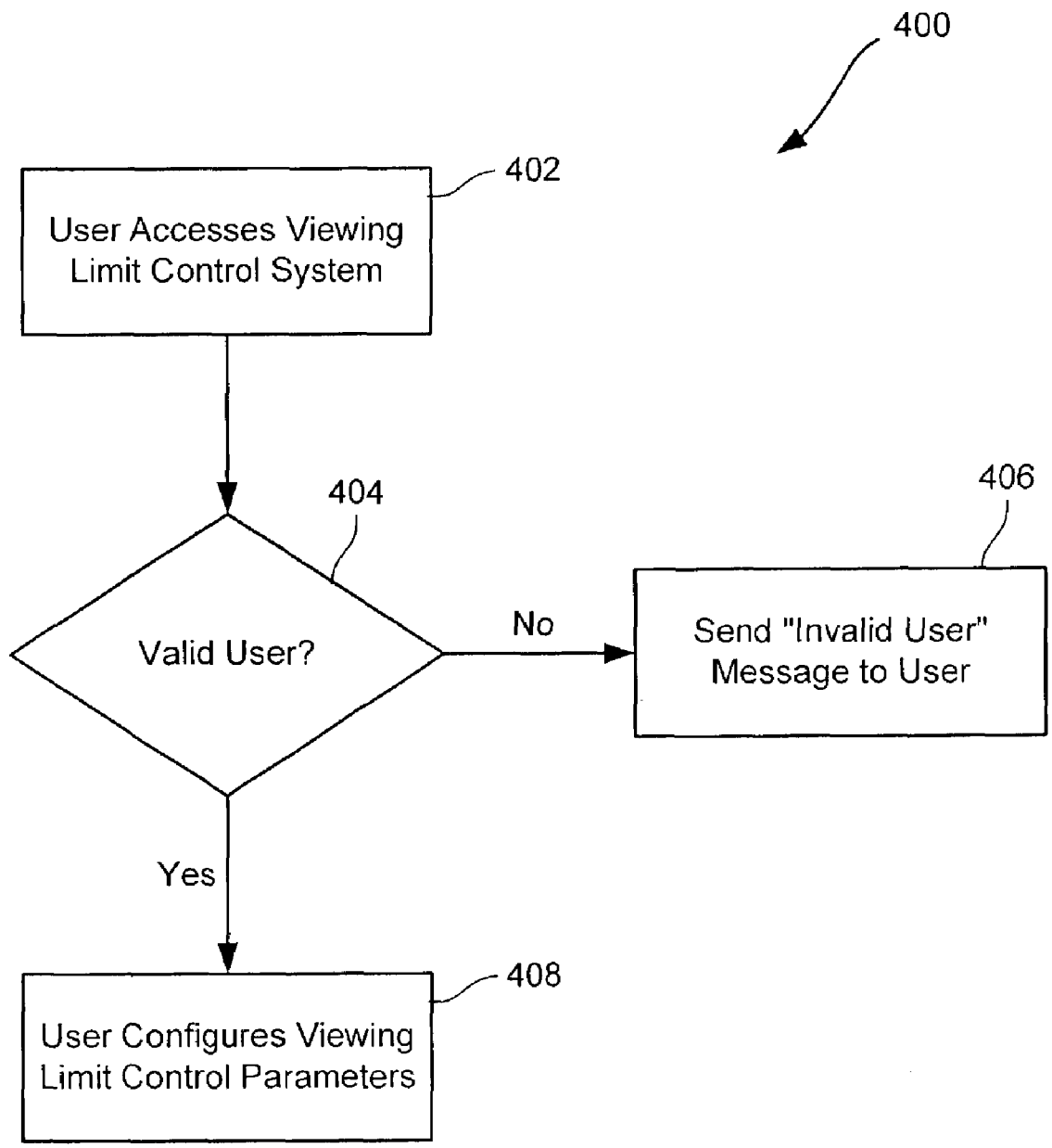
FIG. 4 is a flow chart showing a method for using viewing limit controls to implement parental control of content in accordance with one embodiment of the present invention.

Referring now flow chart 400 in FIG. 4, a method of implementing parental controls using viewing limits will be described. In the illustrated embodiment, a user, for example, parent, will login to the viewing limit control system (block 402), and the system will validate the user (decision block 404). If the user is invalid, the System will send a message, denying access to the System (block 406). Otherwise, the user is given access to a viewing limit configuration menu (block 408). Using the configuration menu, the user can set-up time period and content limits for users and sub-users (e.g., other family members or the like).

In some embodiments, the controls can be for one or more specific end user devices or for a group of devices. Also, the viewing limit controls can be defined for a group of users or separately for individual users and sub-users. For example, a parent could implement different viewing limit controls for each of his children. In this embodiment, the System would need to know which child was accessing the System, for example, by requiring the child to login to the system as discussed above. As one skilled in the art will appreciate, any number of different parental controls can be implemented using the viewing limits of the present invention.

Marketing Messages and Promotions Using Viewing Limits

In some embodiments, the viewing limit control system can be configured to provide marketing and promotional messages to end users. For example, if a user reaches his viewing limit, the viewing limit control system can send a message to the user, and then offer the user the opportunity to qualify for or obtain additional viewings. In other embodiments, if the user is a member of a VOD service, upon reaching a viewing limit for a particular subscription level, the System can offer the subscriber/user the opportunity to upgrade his subscription level to higher or different subscription level.

In yet other embodiments, the System can be configured to provide different marketing messages to end users when viewing limits are reached. For example, when a user reaches a certain viewing limit, one message can be delivered, and when the user reaches a different viewing limit, a different message can be sent. In addition, in some embodiments, the viewing limit system can be used to cross-market other products or services. For example, a user can earn points or awards from other companies (e.g., flight miles or the like) after viewing a predetermined number of programs. Similarly, other companies can provide incentives by offering program viewings when certain purchasing levels or other marketing benchmarks are met.

In still other embodiments, viewing incentives can be provided. For example, after a user selects or watches a predetermined number of viewings, the System can grant the user additional viewings. For example, after ten viewings the user may be granted a free viewing. In still another embodiment, a free viewing period may be available. During that period, programs can be viewed any number of times. The free viewing period may or may not be limited to subscribers.

Figure 5:
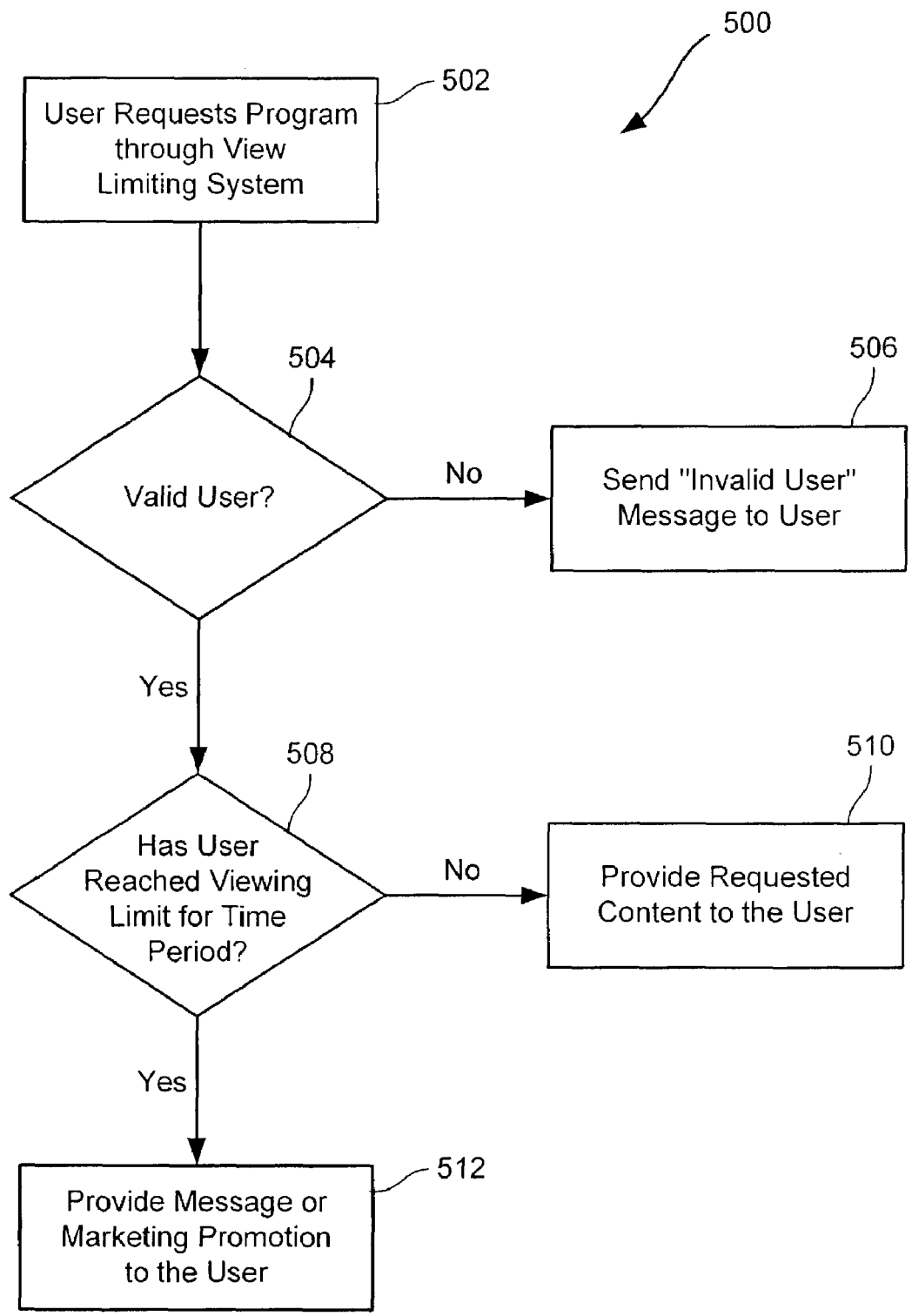
FIG. 5 is a flow chart showing a method for providing marketing and promotional messages based on viewing limit controls.

Referring now to flowchart 500 in FIG. 5, one embodiment of a method for providing marketing messages and incentive awards to users will be described. As in previous embodiments, a user requests a program via the viewing limit control system (block 502), and the System validates the user (decision block 504). If the user is invalid, the System will send a message as such (block 506), otherwise, the System will check the viewing limit of the user (decision block 508). If the viewing limit is at a certain level, the System will provide a marketing message or incentive award (block 512), otherwise, the System will provide the requested program to the user (block 510).

Other embodiments of a systems for providing marketing messages and incentive awards is set forth in U.S. Provisional Patent Application No. 60/391,723, filed on Jun. 25, 2002, and entitled "Video Advertising," the entirety of which is incorporated by reference herein for all purposes.

CONCLUSION

In conclusion, the present invention provides novel systems and methods for providing viewing limit controls on the delivery of content to end users. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. In a system for delivering video programs to end users, a method for controlling the viewing of video programs at a user location having one or more viewing devices, the method comprising:

identifying a first viewing limit allocation for a first type of video on demand (VOD) programming for a first recurring portion of a day over a plurality of days;

identifying a second viewing limit allocation for the first type of programming for a second recurring portion of a day over the plurality of days, the second viewing limit allocation different from the first viewing limit allocation;

counting a number of viewings of the type of VOD programming during the first portion of the day and the second portion of the day over at least a subset of the plurality of days;

determining whether the number of viewings exceeds the applicable viewing limit, wherein a viewing of the first type of VOD programming during the first portion of the day depletes the first viewing limit allocation at a faster rate than the viewing of the first type of VOD programming during the second portion of the day depletes the second viewing limit allocation;

preventing further viewings of the first type of VOD programming during the first portion of the day if the number of viewings for the first portion of the day exceeds the first viewing limit allocation, wherein:

a second program is of a second type that is different from the first type, a third viewing limit is associated with the second type, and the first and second viewing limit allocations are each different from the third viewing limit.

2. The method as recited in claim 1, wherein the type of VOD programming is selected from a group consisting of near VOD programs and subscription VOD programs.

3. The method as recited in claim 1, wherein the the plurality of days comprises years, months, weeks or days.

4. The method as recited in claim 1, wherein the first or second portion of a day comprises at least one of morning, afternoon, evening, night, and prime time viewing periods.

5. The method as recited in claim 1, wherein the step of counting a number of viewings comprises counting a viewing after a predetermined amount of time of the program is viewed.

6. The method as recited in claim 5, wherein the predetermined amount of time of the program comprises a preview of the program.

7. The method as recited in claim 1, wherein the one or more viewing devices is a device selected from a group consisting of an IP telephone, a computer, a PDA, a cellular phone, or any combination of these devices.

8. The method as recited in claim 1, further comprising the step of providing a user interface that shows the number of viewings available to the user for one or more of the portions of the day.

9. The method as recited in claim 8, wherein the step of providing a user interface comprises providing a message on a programming menu stating the number of viewings available to the user for the one or more of the portions of the day.

10. The method as recited in claim 8, wherein the step of providing a user interface comprises providing an icon on a programming menu indicating the number of viewings available to the user for the one or more of the portions of the day.

11. The method as recited in claim 1, wherein the step of counting a number of viewings comprises counting a number of viewings viewed using all of the one or more viewing devices, and wherein the step of preventing further viewings comprises preventing further viewings for all of the one or more viewing devices if the number of viewings exceeds the applicable viewing limit.

12. A system for controlling the viewing of video programs at a user location having one or more viewing devices, comprising:

a program distribution system adapted to provide video programs to one or more viewing devices at a user location; and a viewing control system in communication with the program distribution system and the viewing devices, said viewing control system adapted to:

identify a first viewing limit allocation for a type of video on demand (VOD) programming for a first recurring portion of a day over a plurality of days;

identify a second viewing limit allocation for the type of VOD programming for a second recurring portion of a day over the plurality of days, the second viewing limit allocation different from the first viewing limit allocation;

count a number of viewings of the type of VOD programming during the first portion of the day and the second portion of the day over at least a subset of the plurality of days;

determine whether the number of viewings exceeds the applicable viewing limit, wherein a viewing of the type of VOD programming during the first portion of the day depletes the first viewing limit allocation at a faster rate than the viewing of the type of VOD programming during the second portion of the day depletes the second viewing limit allocation; and prevent further viewings of the type of VOD programming during the second portion of the day if the number of viewings for the second portion of the day exceeds the second viewing limit allocation.

13. The system as recited in claim 12, wherein the program distribution system comprises a cable programming transmission network.

14. The system as recited in claim 12, wherein the program distribution system comprises a satellite programming transmission network.

15. The system as recited in claim 12, wherein the program distribution system comprises a video server connected to the Internet.

16. The system as recited in claim 12, wherein the viewing control system comprises a server located at a program service provider.

17. The system as recited in claim 12, wherein the viewing control system is configured with the program distribution system.

18. The system as recited in claim 12, wherein the viewing control system comprises a personal computer at the user location in communication with a server located at a program service provider.

19. The system as recited in claim 12, wherein the type of VOD programming is selected from a group consisting of near VOD programs and subscription VOD programs.

20. The system as recited in claim 12, wherein the plurality of days comprises years, months, weeks, or days.

21. The system as recited in claim 12, wherein the first or second portion of a day comprises at least one of morning, afternoon, evening, night, and prime time viewing periods.

22. The system as recited in claim 12, wherein the viewing limit can be different for different types of programs.

23. The system as recited in claim 12, wherein the viewing control system is adapted to count a viewing after a predetermined amount of time of the program is viewed.

24. The system as recited in claim 23, wherein the predetermined amount of time of the program comprises a preview of the program.

25. The system as recited in claim 12, wherein the one or more viewing devices is a device selected from a group consisting of an IP telephone, a computer, a PDA, a cellular phone, or any combination of these devices.

26. The system as recited in claim 12, wherein the user interface comprises a message on a programming menu stating the count of viewings available to the user for the one or more of the portions of the day.

27. The system as recited in claim 12, wherein the user interface comprises an icon on a programming menu indicating the count of viewings available to the user for the one or more of the portions of the day.

28. The system as recited in claim 12, wherein the viewing control system is adapted to:

count a number of viewings viewed using all of the one or more viewing devices; and prevent further viewings for all of the one or more viewing devices if the number of viewings exceeds the applicable viewing limit.

29. In a system for delivering video programs to end users, a method for monitoring the viewing of the video programs at a user location having one or more viewing devices, the method comprising steps of:
   identifying a first viewing limit allocation for a first type of video on demand (VOD) programming for a first recurring portion of a day over a plurality of days;
   identifying a second viewing limit allocation for the type of VOD programming for a second recurring portion of a day over the plurality of days, the second viewing limit allocation different from the first viewing limit allocation;
   counting a number of viewings of a plurality of programs of the type of VOD programming during the first portion of the day over at least a subset of the plurality of days;
   determining whether the number of viewings exceeds the first viewing limit allocation;
   preventing further viewings of the type of VOD programming during the first portion of the day if the number of viewings for the first portion of the day exceeds the first viewing limit allocation;
   counting a second number of viewings of a second plurality of programs of the type of VOD programming during the second portion of the day over the at least the subset of the plurality of days;
   determining whether the second number of viewings exceeds the second viewing limit allocation, wherein a viewing of the type of VOD programming during the second portion of the day depletes the second viewing limit allocation at a faster rate than the viewing of the type of VOD programming during the first portion of the day depletes the first viewing limit allocation; and
   preventing further viewings of the type of VOD programming during the second portion of the day if the second number of viewings exceeds the second viewing limit allocation.

30. The method as recited in claim 5, wherein the program types are related to at least one of popularity of a program and a type of distribution service that makes the program available.

31. The system as recited in claim 28, wherein:
   the one or more viewing devices comprises a first viewing device and a second viewing device, and
   the first viewing device is at a location away from the second viewing device.

32. The system as recited in claim 28, wherein one of the first and second viewing devices requires entry of information to associate it with a particular account.

33. In a system for delivering video programs to end users, a method for controlling the viewing of video programs at a user location having one or more viewing devices, the method comprising:
   identifying a first viewing limit allocation for a type of subscription programming for a first recurring portion of a day over a plurality of days;
   identifying a second viewing limit allocation for the type of subscription programming for a second recurring portion of a day over the plurality of days, the second viewing limit allocation different from the first viewing limit allocation;
   counting a number of viewings of the type of subscription programming during the first portion of the day over at least a subset of the plurality of days;
   determining whether the number of viewings exceeds the first viewing limit allocation;
   preventing further viewings of the type of subscription programming during the first portion of the day if the number of viewings for the first portion of the day exceeds the first viewing limit allocation;
   counting a second number of viewings of the type of subscription programming during the second portion of the day over the at least the subset of the plurality of days;
   determining whether the second number of viewings exceeds the second viewing limit allocation, wherein a viewing of the type of subscription programming during the second portion of the day depletes the second viewing limit allocation at a faster rate than the viewing of the type of subscription programming during the first portion of the day depletes the first viewing limit allocation; and
   preventing further viewings of the type of subscription programming during the second portion of the day if the second number of viewings exceeds the second viewing limit allocation.

34. In a system for delivering video programs to end users, a method for controlling the viewing of video programs at a user location having one or more viewing devices, the method comprising:
   identifying a first viewing limit allocation for a subscription tier of programming for a first recurring portion of a day over a plurality of days;
   identifying a second viewing limit allocation for the subscription tier of programming for a second recurring portion of a day over the plurality of days, the second viewing limit allocation different from the first viewing limit allocation;
   counting a number of viewings of the subscription tier of programming during the first portion of the day and the second portion of the day over at least a subset of the plurality of days;
   determining whether the number of viewings exceeds the applicable viewing limit, wherein a viewing of the subscription tier of programming during the first portion of the day depletes the first viewing limit allocation at a faster rate than the viewing of the subscription tier of programming during the second portion of the day depletes the second viewing limit allocation; and
   preventing further viewings of the subscription tier of programming during the first portion of the day if the number of viewings for the first portion of the day exceeds the first viewing limit allocation, wherein:
   the subscription tier is of a first type of programming,
   a second program is of a second type that is different from the first type,
   the first and second viewing limit allocations are associated with the first type,
   a second viewing limit is associated with the second type,
   the first and second viewing limit allocations are different from the second viewing limit,
   the system includes a plurality of programming tiers,
   the view limit corresponds to a first tier of the plurality of programming tiers, and
   the second view limit corresponds to a second tier of the plurality of programming tiers.

35. In a system for delivering video programs to end users, a method for controlling the viewing of video programs at a user location having one or more viewing devices, the method comprising:

identifying a first viewing limit allocation for a subscription tier of programming for a first recurring portion of a day over a plurality of days;

identifying a second viewing limit allocation for the subscription tier programming for a second recurring portion of a day over the plurality of days, the second viewing limit allocation different from the first viewing limit allocation;

counting a number of viewings of the subscription tier of programming during the first portion of the day over at least a subset of the plurality of days;

determining whether the number of viewings exceeds the first viewing limit allocation; and preventing further viewings of the subscription tier of programming during the first portion of the day if the number of viewings for the first portion of the day exceeds the first viewing limit allocation;

counting a second number of viewings of the subscription tier of programming during the second portion of the day over the at least the subset of the plurality of days;

determining whether the second number of viewings exceeds a the second viewing limit allocation, wherein a viewing of the subscription tier of programming during the second portion of the day depletes the second viewing limit allocation at a faster rate than the viewing of the subscription tier of programming during the first portion of the day depletes the first viewing limit allocation; and preventing further viewings of the subscription tier of programming during the first portion of the day if the second number of viewings for the first portion of the day exceeds the second viewing limit allocation.

36. The method of claim 1, wherein the number of viewings comprise minute increments, other time increments, increments beyond a threshold, or complete program viewings.

* * * * *

UNITED STATES PATENT AND TRADEMARK OFFICE
CERTIFICATE OF CORRECTION

PATENT NO. : 7,464,392 B2  Page 1 of 1
APPLICATION NO. : 10/300723
DATED : December 9, 2008
INVENTOR(S) : John J. Sie et al.

It is certified that error appears in the above-identified patent and that said Letters Patent is hereby corrected as shown below:

At Column 13, line 14, delete "the" after "wherein".

At Column 18, line 2, delete "a" after "exceeds".

Signed and Sealed this

Tenth Day of February, 2009

JOHN DOLL
*Acting Director of the United States Patent and Trademark Office*